(12) United States Patent
Boulard et al.

(10) Patent No.: US 9,790,420 B2
(45) Date of Patent: Oct. 17, 2017

(54) COMPOSITIONS AND METHODS FOR CLEANING SUBTERRANEAN BOREHOLES

(75) Inventors: Stephane Boulard, Houston, TX (US); Jesse C. Lee, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 275 days.

(21) Appl. No.: 13/565,811

(22) Filed: Aug. 3, 2012

(65) Prior Publication Data
US 2013/0048285 A1 Feb. 28, 2013

(51) Int. Cl.
| | |
|---|---|
| *E21B 37/00* | (2006.01) |
| *E21B 37/08* | (2006.01) |
| *C09K 8/52* | (2006.01) |
| *C09K 8/524* | (2006.01) |
| *C09K 8/12* | (2006.01) |
| *C09K 8/40* | (2006.01) |
| *C09K 8/42* | (2006.01) |
| *C09K 8/467* | (2006.01) |
| *E21B 33/13* | (2006.01) |
| *C04B 28/02* | (2006.01) |
| *C04B 20/10* | (2006.01) |

(52) U.S. Cl.
CPC .......... *C09K 8/524* (2013.01); *C04B 20/1029* (2013.01); *C04B 28/02* (2013.01); *C09K 8/12* (2013.01); *C09K 8/40* (2013.01); *C09K 8/424* (2013.01); *C09K 8/467* (2013.01); *E21B 33/13* (2013.01); *C09K 2208/08* (2013.01)

(58) Field of Classification Search
CPC .. C09K 2208/08; C09K 8/52; C09K 2208/10; E21B 37/00; E21B 37/08

USPC ................ 166/311, 312, 310, 293
See application file for complete search history.

(56) References Cited

U.S. PATENT DOCUMENTS

| | | | |
|---|---|---|---|
| 5,143,594 | A | 9/1992 | Stephenson et al. |
| 5,904,208 | A * | 5/1999 | Ray et al. ............. 166/312 |
| 6,085,844 | A * | 7/2000 | Palmer et al. ........ 166/312 |
| 6,196,320 | B1 * | 3/2001 | Ray et al. ............. 166/312 |
| 7,665,522 | B2 * | 2/2010 | Sullivan ............... C09K 8/52 |
| | | | 166/300 |
| 2003/0143368 | A1 | 7/2003 | Kohlruss et al. |
| 2006/0054324 | A1 | 3/2006 | Sullivan et al. |
| 2006/0258545 | A1 * | 11/2006 | Chatterji ............. C09K 8/04 |
| | | | 507/219 |
| 2009/0205824 | A1 * | 8/2009 | Sullivan et al. ....... 166/278 |
| 2010/0051272 | A1 * | 3/2010 | Loree et al. ......... 166/279 |

FOREIGN PATENT DOCUMENTS

| | | |
|---|---|---|
| WO | 98/31917 | 7/1998 |
| WO | 2011/076344 | 6/2011 |

OTHER PUBLICATIONS

Article 94(3) EPC issued in related EP application 11306087.5 on Jul. 11, 2016, 6 pages.

(Continued)

*Primary Examiner* — Catherine Loikith
(74) *Attorney, Agent, or Firm* — Andrea E. Tran

(57) ABSTRACT

Lipophilic fibers are effective media for cleaning non-aqueous fluids out of a subterranean wellbore. The fibers are preferably added to a drilling fluid, a spacer fluid, a chemical wash, a cement slurry or combinations thereof. Non-aqueous fluids, such as an oil-base mud or a water-in-oil emulsion mud, are attracted to the fibers as they circulate in the wellbore.

11 Claims, 1 Drawing Sheet

(56) References Cited

OTHER PUBLICATIONS

Communication issued in related EP Application No. 11306087.5 mailed Nov. 26, 2015.
Piot B and Cuvillier G: "Primary Cementing Techniques," in Nelson EB and Guillot D: Well Cementing—2nd Edition, Houston, Schlumberger (2006) 459-501.
Daccord G, Guillot D and Nilsson F: "Mud Removal," in in Nelson EB and Guillot D: Well Cementing—2nd Edition, Houston, Schlumberger (2006) 143-189.
Examination Report issued in European Patent Appl. No. 11306087.5 dated Feb. 24, 2017; 6 pages.

* cited by examiner

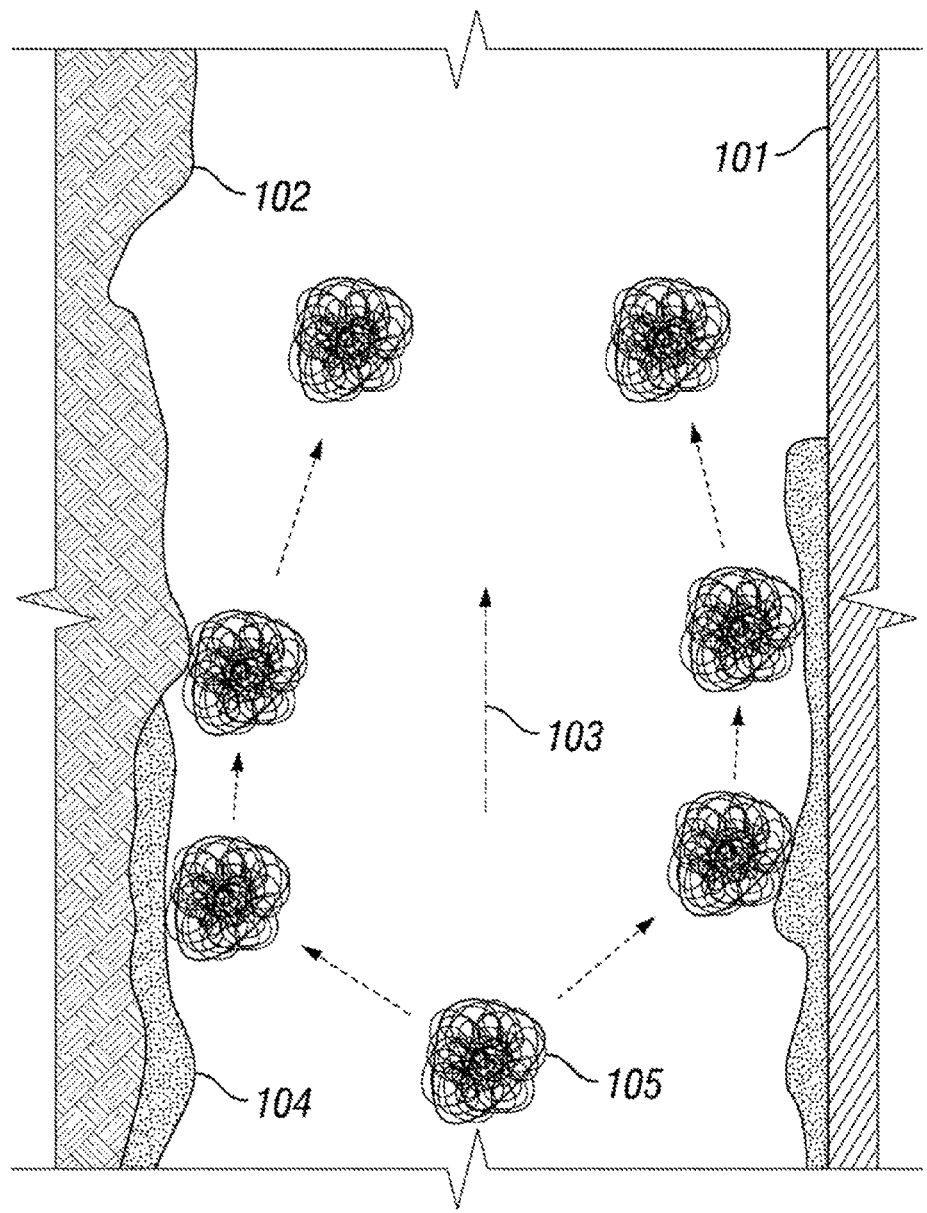

COMPOSITIONS AND METHODS FOR CLEANING SUBTERRANEAN BOREHOLES

CROSS REFERENCED APPLICATIONS

This application claims the benefit of the disclosure of European patent application number 11306087.5 filed on Aug. 31, 2011 incorporated by reference in its entirety.

BACKGROUND

The statements in this section merely provide background information related to the present disclosure and may not constitute prior art.

This disclosure relates to compositions and methods for removing non-aqueous fluids from a subterranean wellbore.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole is necessary to prevent leaks.

The cement sheath is usually placed in the annular region between the outside of the tubular body and the subterranean borehole wall by pumping the cement slurry down the interior of the tubular body, out the bottom and up into the annulus. The cement slurry may also be placed by the "reverse cementing" method, whereby the slurry is pumped directly down into the annular space. During the cementing process, the cement slurry is frequently preceded by a spacer fluid or chemical wash to prevent commingling with drilling fluid in the wellbore. These fluids also help clean the tubular-body and formation surfaces, promoting better cement bonding and zonal isolation. The cement slurry may also be followed by a displacement fluid such as water or a brine. This fluid usually resides inside the tubular body after the cementing process is complete. A complete description of the cementing process and the use of spacer fluids and chemical washes is presented in the following publications. Piot B and Cuvillier G: "Primary Cementing Techniques," in Nelson E B and Guillot D: *Well Cementing*-2nd Edition, Houston, Schlumberger (2006) 459-501. Daccord G, Guillot D and Nilsson F: "Mud Removal," in in Nelson E B and Guillot D: *Well Cementing*-2nd Edition, Houston, Schlumberger (2006) 143-189.

Drilling-fluid removal and wellbore cleaning may be challenging when the well has been drilled with non-aqueous fluids. In the art of well cementing, non-aqueous fluids may be oil-base muds or water-in-oil emulsions. Conventionally, operators employ water-base spacer fluids or chemical washes comprising surfactants that render the fluids compatible with non-aqueous fluids. In the context of well cementing, fluids are compatible when no negative rheological effects such as gelation occur upon their commingling. Such effects may hinder proper fluid displacement, leaving gelled fluid in the wellbore and reducing the likelihood of achieving proper zonal isolation. Ideally, the spacer fluid, chemical wash or both will completely remove the non-aqueous fluid and leave casing and formation surfaces in the annulus water wet. Water-wet surfaces may promote intimate bonding between the cement sheath and casing and formation surfaces.

Many of the surfactants commonly used in the art to impart compatibility of spacer fluids and chemical washes with non-aqueous fluids may not be suitable for use in regions where governmental regulations restrict their use, disposal, or both. Therefore, despite the valuable contributions of the prior art, it remains desirable to have materials and methods by which non-aqueous fluids may be removed from a wellbore, yet comply with governmental regulations.

SUMMARY

The present disclosure describes such improvements. Aqueous fluid including (but not limited to) spacer fluids, chemical washes, drilling fluids and cement slurries are provided that are compatible with non-aqueous fluids and have the ability to remove them from a wellbore during a cementing treatment. In an aspect, embodiments relate to methods for cleaning surfaces coated with a non-aqueous fluid. In a further aspect, embodiments relate to methods for cementing a subterranean well.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

A drawing shows a diagram illustrating the ability of lipophilic fibers to remove non-aqueous fluids from casing and formation surfaces in a wellbore.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments should not be construed as a limitation to the scope and applicability of the disclosed embodiments. While the compositions of the present disclosure are described herein as comprising certain materials, it should be understood that the composition could optionally comprise two or more chemically different materials. In addition, the composition can also comprise some components other than the ones already cited.

The Applicants have determined that aqueous treatment fluids comprising lipophilic fibers may clean surfaces that are coated with a non-aqueous fluid.

Embodiments relate to methods for cleaning surfaces coated with a non-aqueous fluid. Such surfaces comprise a borehole in a subterranean well whose surfaces are coated with a non-aqueous fluid. An aqueous treatment fluid is provided that comprises lipophilic fibers. The aqueous treatment fluid may comprise (but would not be limited to) a drilling fluid, a spacer fluid, a chemical wash, or a cement slurry, or combinations thereof.

The fibers may comprise polypropylene-isotactic, polypropylene-atactic, polypropylene-syndiotactic, polyester, polydimethylsiloxane, polytetrafluoroethylene, polytrifluoroethylene, polyhexylmethacrylate, polyvinylidene fluoride, poly(t-butylmethacrylate), polychlorotrifluoroethylene, polyisobutylmethacrylate, polybutylmethacrylate, polytetramethylene oxide, polytetrahydrofurane, polyisobutylene, polycarbonate, polyethylene-branched, polyethylene-linear, polyethylmethacrylate, polyvinylacetate, polyvinyl fluoride, polyethylacrylate, poly-a-methyl styrene, polyvinyltoluene, polystyrene, polyamide-12, polymethylacrylate, polymethylmethacrylate, polyvinylchloride, polyetheretherketone, polyethylene oxide, polyethyleneterephthalate, polyvinylidene chloride, or polyamide-6,6, and combinations thereof. The fiber length may be between about 5 mm and 50 mm. The fiber geometry may be cylindrical, trilobal, ribbon like, or grooved, and combinations thereof. An example of a grooved fiber is 4DG™ fibers from Fiber Innovation Technology, Inc., Johnson City, Tenn. 37604, USA. The fibers may be further coated with a hydrophilic material, or sizing, to promote dispersion in the aqueous medium. Suitable coatings may include (but would not be limited to) starch, xanthan polymers, diutan, scleroglucan, guar, guar derivatives, carboxymethylcellulose, hydroxyethylcellulose, hydroxypropylcellulose, polyvinyl alcohols, or water-soluble acrylates and combinations thereof.

The solid surface energy of the fibers may be less than the surface tension of water, or between about 20 mN/m and 40 mN/m. For efficiency, the fibers are selected such that they may absorb between about 10 times to about 60 times their weight of non-aqueous fluid.

The surfaces coated with non-aqueous fluid are placed in contact with the treatment fluid. In a wellbore, the treatment fluid may be circulated, for example in the annular space between the casing (or other tubular body) and the subterranean formation wall. The circulation of the treatment fluid may remove the non-aqueous fluid, filter cake or both from the casing and formation surfaces, leaving them water wet. The treatment fluid is then removed from the wellbore. The treatment fluid may further comprise a surfactant. Suitable surfactants may include (but would not be limited to) alkylammonium compounds, dodecyl benzene sulfonate, derivatives of oxyethylated esters of fatty acids and polyglycol esters of alkyl phenols.

The treatment fluid is then removed from the wellbore, leaving the tubular-body and formation surfaces water wet.

One example of the method is illustrated in the drawing. Casing 101 is present in the wellbore, and a non-aqueous coating 104 is deposited on its surface. On the other side of the annular space, a non-aqueous coating 104 also is attached to the formation wall 102. The treatment fluid comprising lipophilic fibers 105 is flowing upward 103 in the annular space. The lipophilic nature of the fibers causes the non-aqueous coating to be removed from the casing and formation surfaces as they travel up the annulus.

Embodiments relate to methods for cementing a subterranean well. An aqueous treatment fluid is provided that comprises lipophilic fibers. The aqueous treatment fluid may comprise a drilling fluid, a spacer fluid, a chemical wash, or a cement slurry, or combinations thereof.

The fibers may comprise polypropylene-isotactic, polypropylene-atactic, polypropylene-syndiotactic, polyester, polydimethylsiloxane, polytetrafluoroethylene, polytrifluoroethylene, polyhexylmethacrylate, polyvinylidene fluoride, poly(t-butylmethacrylate), polychlorotrifluoroethylene, polyisobutylmethacrylate, polybutylmethacrylate, polytetramethylene oxide, polytetrahydrofurane, polyisobutylene, polycarbonate, polyethylene-branched, polyethylene-linear, polyethylmethacrylate, polyvinylacetate, polyvinyl fluoride, polyethylacrylate, poly-a-methyl styrene, polyvinyltoluene, polystyrene, polyamide-12, polymethylacrylate, polymethylmethacrylate, polyvinylchloride, polyetheretherketone, polyethylene oxide, polyethyleneterephthalate, polyvinylidene chloride, or polyamide-6,6, and combinations thereof. The fiber length may be between about 5 mm and 50 mm. The fiber geometry may be cylindrical, trilobal, ribbon like, or grooved, and combinations thereof. An example of a grooved fiber is 4DG™ fibers from Fiber Innovation Technology, Inc., Johnson City, Tenn. 37604, USA. The fibers may be further coated with a hydrophilic material, or sizing, to promote dispersion in the aqueous medium. Suitable coatings may include (but would not be limited to) starch, xanthan polymers diutan, scleroglucan, guar, guar derivatives, carboxymethylcellulose, hydroxyethylcellulose, hydroxypropylcellulose, polyvinyl alcohols, or water-soluble acrylates and combinations thereof.

The solid surface energy of the fibers is may be less than the surface tension of water, or between about 20 mN/m and 40 mN/m. For efficiency, the fibers are selected such that they may absorb between about 10 times to about 60 times their weight of non-aqueous fluid.

The treatment fluid is circulated in the wellbore, for example in the annular space between the casing (or other tubular body) and the subterranean formation wall. The circulation of the treatment fluid may remove the non-aqueous fluid, filter cake or both from the casing and formation surfaces, leaving them water wet. The treatment fluid is then removed from the wellbore. The treatment fluid may further comprise a surfactant. Suitable surfactants may include (but would not be limited to) alkylammonium compounds, dodecyl benzene sulfonate, derivatives of oxyethylated esters of fatty acids and polyglycol esters of alkyl phenols.

The treatment fluid is then removed from the wellbore, leaving the tubular-body and formation surfaces water wet.

A cement slurry is then provided and placed in the annular space between the tubular body and the subterranean-formation wall.

Example

The following example serves to further illustrate the invention.

40 mL of water containing 0.25 wt % polyolefin fibers, with a length of 18-20 mm and a diameter less than about 0.03 mm, were placed in a 50-mL glass vial with a cap. 0.2 mL of an water-in-oil emulsion drilling fluid from MI SWACO, Houston, Tex. USA were added to the vial. After capping the vial, the mixture was shaken. The drilling fluid was attracted to the fibers, allowing the fluid to be removed from the vial with the fibers. Clear water was left in the vial.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The invention claimed is:

1. A method for cleaning a borehole in a subterranean well whose surfaces are coated with a non-aqueous fluid and are initially oil wet, comprising:
   (i) providing an aqueous treatment fluid comprising lipophilic fibers coated by a hydrophilic sizing to promote dispersion in the aqueous treatment fluid;
   (ii) circulating the treatment fluid in the borehole; and
   (iii) removing the treatment fluid from the borehole;
   wherein, the non-aqueous fluid is removed from the well and the borehole surfaces are rendered water wet;
   wherein the fibers contact the non-aqueous fluid, absorb 10 to 60 times their weight of the non-aqueous fluid and have a solid surface energy between 20 mN/m and 40 mN/m,
   wherein the hydrophilic sizing comprises starch, xanthan polymers, guar, guar derivatives, carboxymethylcellulose, hydroxyethylcellulose, hydroxypropylcellulose, polyvinyl alcohols, or water-soluble acrylates or combinations thereof.

2. The method of claim 1, wherein the fibers comprise polypropylene-isotactic, polypropylene-atactic, polypropylene-syndiotactic, polyester, polydimethylsiloxane, polytetrafluoroethylene, polytrifluoroethylene, polyhexylmethacrylate, polyvinylidene fluoride, poly(t-butylmethacrylate), polychlorotrifluoroethylene, polyisobutylmethacrylate, polybutylmethacrylate, polytetramethylene oxide, polytetrahydrofurane, polyisobutylene, polycarbonate, polyethylene-branched, polyethylene-linear, polyethylmethacrylate, polyvinylacetate, polyvinyl fluoride, polyethylacrylate, poly-a-methyl styrene, polyvinyltoluene, polystyrene, polyamide-12, polymethylacrylate, polymethylmethacrylate, polyvinylchloride, polyetheretherketone, polyethylene oxide, polyethyleneterephthalate, polyvinylidine chloride, or polyamide-6,6, and combinations thereof.

3. The method of claim 1, wherein the aqueous treatment fluid comprises a drilling fluid, a spacer fluid, a chemical wash, or a cement slurry, and combinations thereof.

4. The method of claim 1, wherein the aqueous treatment fluid further comprises a surfactant.

5. A method for cementing a subterranean well having a borehole whose surfaces are initially oil wet, comprising:
   (i) providing an aqueous treatment fluid comprising lipophilic fibers coated by a hydrophilic sizing to promote dispersion in the aqueous treatment fluid;
   (ii) circulating the treatment fluid in the borehole;
   (iii) removing the treatment fluid from the borehole, wherein non-aqueous fluid is removed from the well and borehole surfaces are rendered water wet;
   (iv) providing a cement slurry; and
   (v) placing the slurry in the well;
   wherein the fibers contact the non-aqueous fluid, absorb 10 to 60 times their weight of the non-aqueous fluid and have a solid surface energy between 20 mN/m and 40 mN/m,
   wherein the hydrophilic sizing comprises starch, xanthan polymers, guar, guar derivatives, carboxymethylcellulose, hydroxyethylcellulose, hydroxypropylcellulose, polyvinyl alcohols, or water-soluble acrylates or combinations thereof.

6. The method of claim 5, wherein the fibers comprise polypropylene-isotactic, polypropylene-atactic, polypropylene-syndiotactic, polyester, polydimethylsiloxane, polytetrafluoroethylene, polytrifluoroethylene, polyhexylmethacrylate, polyvinylidene fluoride, poly(t-butylmethacrylate), polychlorotrifluoroethylene, polyisobutylmethacrylate, polybutylmethacrylate, polytetramethylene oxide, polytetrahydrofurane, polyisobutylene, polycarbonate, polyethylene-branched, polyethylene-linear, polyethylmethacrylate, polyvinylacetate, polyvinyl fluoride, polyethylacrylate, poly-a-methyl styrene, polyvinyltoluene, polystyrene, polyamide-12, polymethylacrylate, polymethylmethacrylate, polyvinylchloride, polyetheretherketone, polyethylene oxide, polyethyleneterephthalate, polyvinylidine chloride, or polyamide-6,6, and combinations thereof.

7. The method of claim 5, wherein the aqueous treatment fluid comprises a drilling fluid, a spacer fluid, a chemical wash, or a cement slurry, and combinations thereof.

8. The method of claim 5, wherein the aqueous treatment fluid further comprises a surfactant.

9. A method of treating a well having a borehole, the borehole drilled with oil based mud or synthetic based mud, whose surfaces are initially oil wet, the method comprising:
   (i) providing an aqueous treatment fluid comprising lipophilic fibers coated by a hydrophilic sizing to promote dispersion in the aqueous treatment fluid;
   (ii) circulating the treatment fluid in the borehole; and
   (iii) removing the treatment fluid from the borehole;
   wherein, non-aqueous fluid is removed from the well and borehole surfaces are rendered water wet;
   wherein the fibers contact the non-aqueous fluid, absorb 10 to 60 times their weight of the non-aqueous fluid and have a solid surface energy between 20 mN/m and 40 mN/m,
   wherein the hydrophilic sizing comprises starch, xanthan polymers, guar, guar derivatives, carboxymethylcellulose, hydroxyethylcellulose, hydroxypropylcellulose, polyvinyl alcohols, or water-soluble acrylates or combinations thereof.

10. The method of claim 9, wherein the fibers comprise polypropylene-isotactic, polypropylene-atactic, polypropylene-syndiotactic, polyester, polydimethylsiloxane, polytetrafluoroethylene, polytrifluoroethylene, polyhexylmethacrylate, polyvinylidene fluoride, poly(t-butylmethacrylate), polychlorotrifluoroethylene, polyisobutylmethacrylate, polybutylmethacrylate, polytetramethylene oxide, polytetrahydrofurane, polyisobutylene, polycarbonate, polyethylene-branched, polyethylene-linear, polyethylmethacrylate, polyvinylacetate, polyvinyl fluoride, polyethylacrylate, poly-a-methyl styrene, polyvinyltoluene, polystyrene, polyamide-12, polymethylacrylate, polymethylmethacrylate, polyvinylchloride, polyetheretherketone, polyethylene oxide, polyethyleneterephthalate, polyvinylidine chloride, or polyamide-6,6, and combinations thereof.

11. The method of claim 9, wherein the aqueous treatment fluid comprises a drilling fluid, a spacer fluid, a chemical wash, or a cement slurry, and combinations thereof.

* * * * *